(12) United States Patent
Jepsen

(10) Patent No.: US 7,746,431 B2
(45) Date of Patent: Jun. 29, 2010

(54) DUAL MODE DISPLAY

(75) Inventor: Mary Lou Jepsen, Hull, MA (US)

(73) Assignee: One Laptop Per Child Association, Inc, Cambridge, MA (US)

( * ) Notice: Subject to any disclaimer, the term of this patent is extended or adjusted under 35 U.S.C. 154(b) by 228 days.

(21) Appl. No.: 11/897,588

(22) Filed: Aug. 31, 2007

(65) Prior Publication Data

US 2008/0117346 A1 May 22, 2008

Related U.S. Application Data

(60) Provisional application No. 60/860,247, filed on Nov. 21, 2006.

(30) Foreign Application Priority Data

Nov. 21, 2006 (WO) .............. PCT/US2006/045050

(51) Int. Cl.
*G02F 1/1335* (2006.01)
(52) U.S. Cl. ..................... 349/114; 349/106
(58) Field of Classification Search ................. 349/114, 349/61, 65, 151, 106, 155, 113, 146; 362/611, 362/612
See application file for complete search history.

(56) References Cited

U.S. PATENT DOCUMENTS

| | | | | |
|---|---|---|---|---|
| 5,748,828 | A * | 5/1998 | Steiner et al. | 385/146 |
| 6,930,664 | B2 * | 8/2005 | Kim et al. | 345/99 |
| 7,196,766 | B2 * | 3/2007 | Yang et al. | 349/192 |
| 7,463,327 | B2 * | 12/2008 | Tasaka et al. | 349/155 |
| 2003/0052974 | A1 | 3/2003 | Glenn | |
| 2004/0109111 | A1 * | 6/2004 | Ino | 349/113 |

(Continued)

FOREIGN PATENT DOCUMENTS

| | | |
|---|---|---|
| CN | 2604705 Y | 2/2004 |
| CN | 1632666 A | 6/2005 |

(Continued)

OTHER PUBLICATIONS

Claims, application No. 2007101101724, May 8, 2009, 4 pages.

(Continued)

*Primary Examiner*—Thoi V Duong
(74) *Attorney, Agent, or Firm*—William L. Botjer

(57) ABSTRACT

A dual mode Liquid Crystal Display (LCD) capable of functioning in a dual mode, a monochrome reflective mode and a color transmissive mode. The present invention provides an LCD with color filters only over the transmissive part of a pixel, enabling readability in the ambient light. Yet another aspect of the present invention is the elimination of the black matrix mask used typically in color filter creation. Additionally, the present invention provides diagonal pixels to improve the resolution of the LCD in the color transmissive mode. Further, an aspect of the present invention enables the light to switch between two colors, while a third color (typically green) is always on, thereby, decreasing the required frame rate of the LCD, when used in the hybrid field sequential approach. Yet another aspect of the present invention is to create colors from the backlight, eliminating the need for color filters. Yet another aspect of the present invention is use of color filters over only the green pixels, eliminating the need for using additional masks for making the color filter array.

20 Claims, 6 Drawing Sheets

U.S. PATENT DOCUMENTS

2004/0201814 A1* 10/2004 Yamamoto .................. 349/156
2005/0057711 A1 3/2005 Chang et al.

OTHER PUBLICATIONS

Concise statement of the Chinese office action, application No. 2007101101724, dated Jan. 15, 2010, 1 page. A copy of the un-translated Chinese Office Action has also been submitted originally dated May 8, 2009, 6 pages.

This is an English translation of the Office Action in Chinese Application No. 2007101101724, which was cited in the previously IDS filed on Jan. 15, 2010, 6 pages. A copy of the previously submitted un-translated Chinese Office Action has also been submitted originally dated May 8, 2009, 6 pages.

* cited by examiner

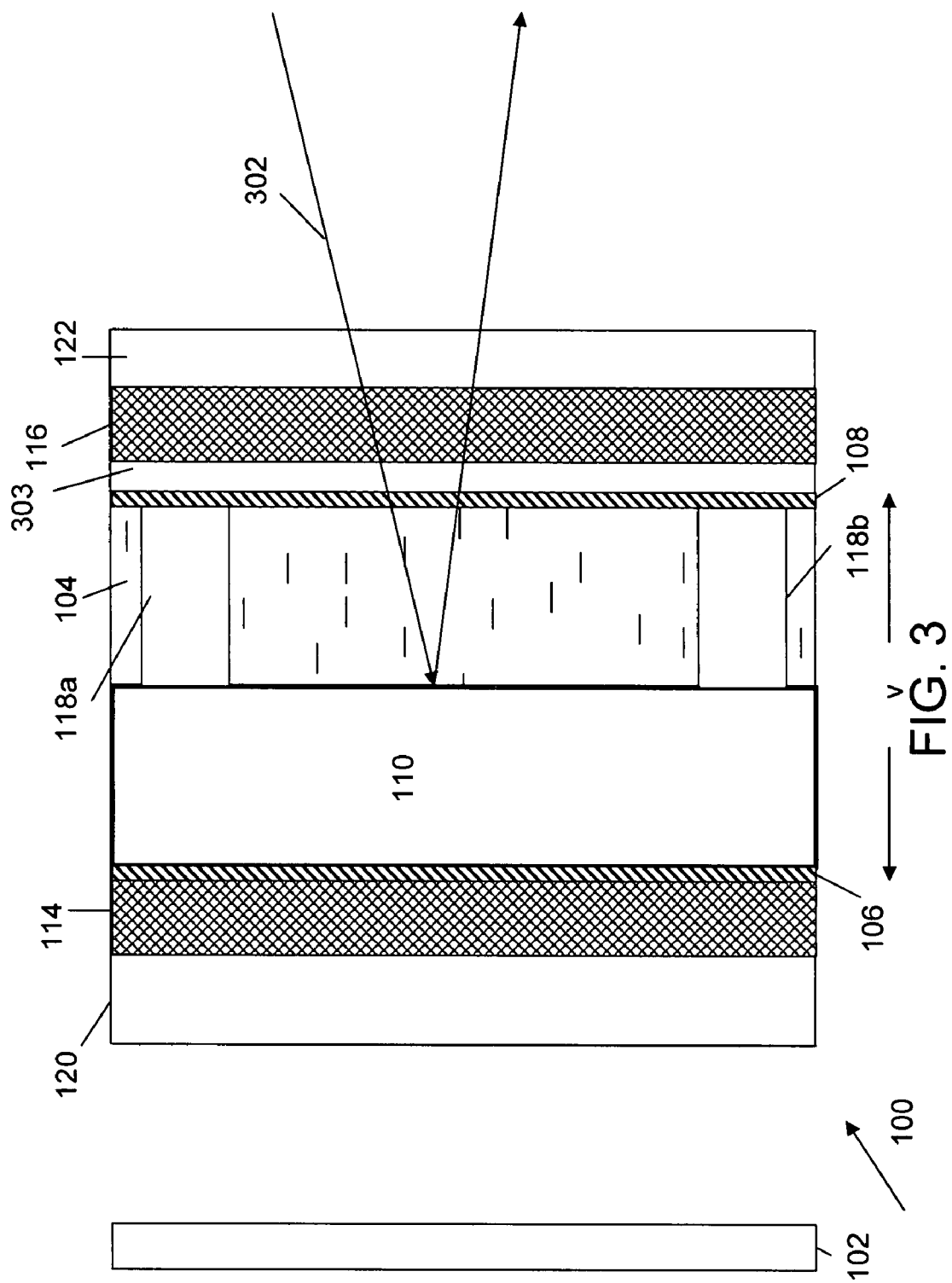

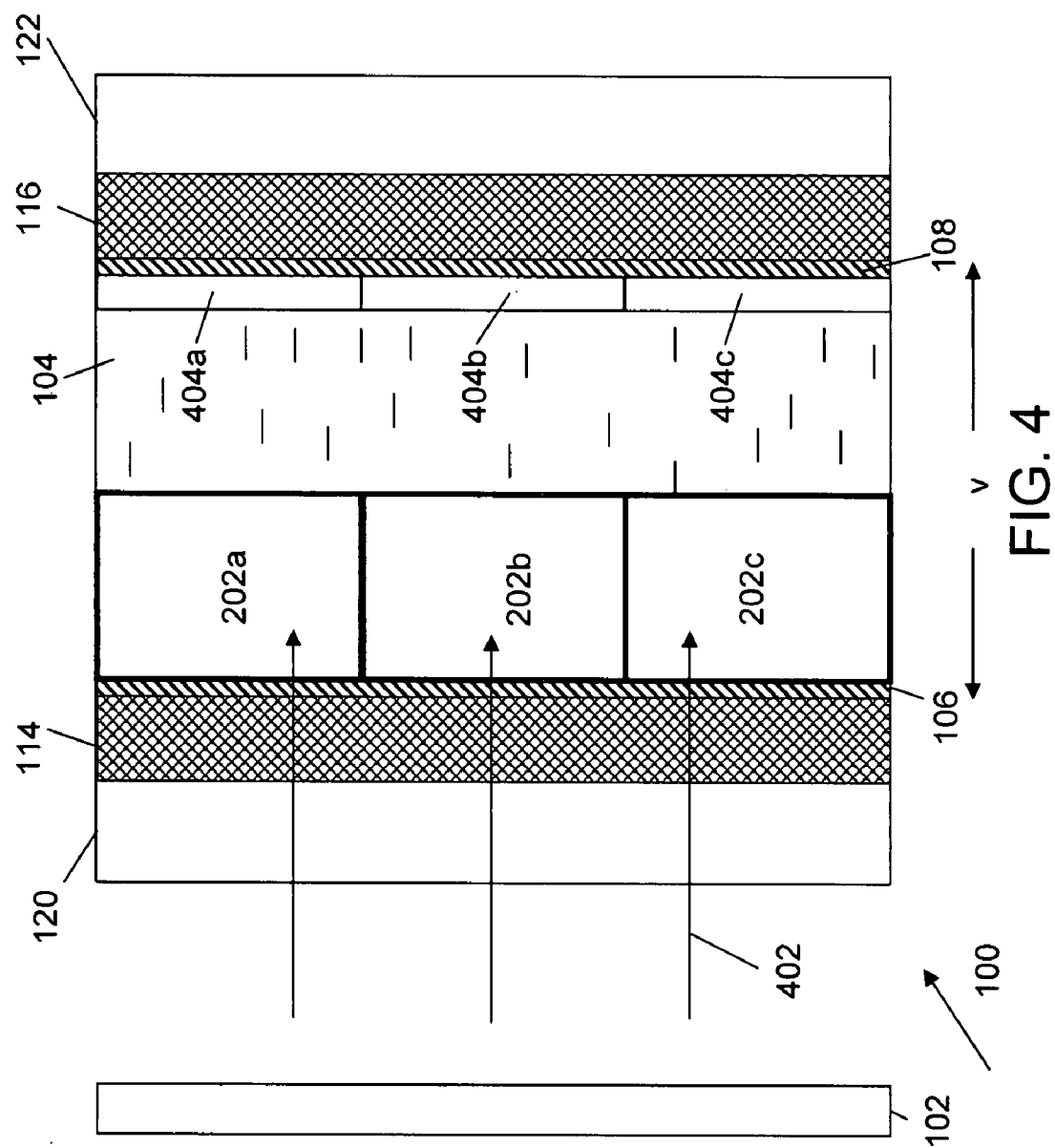

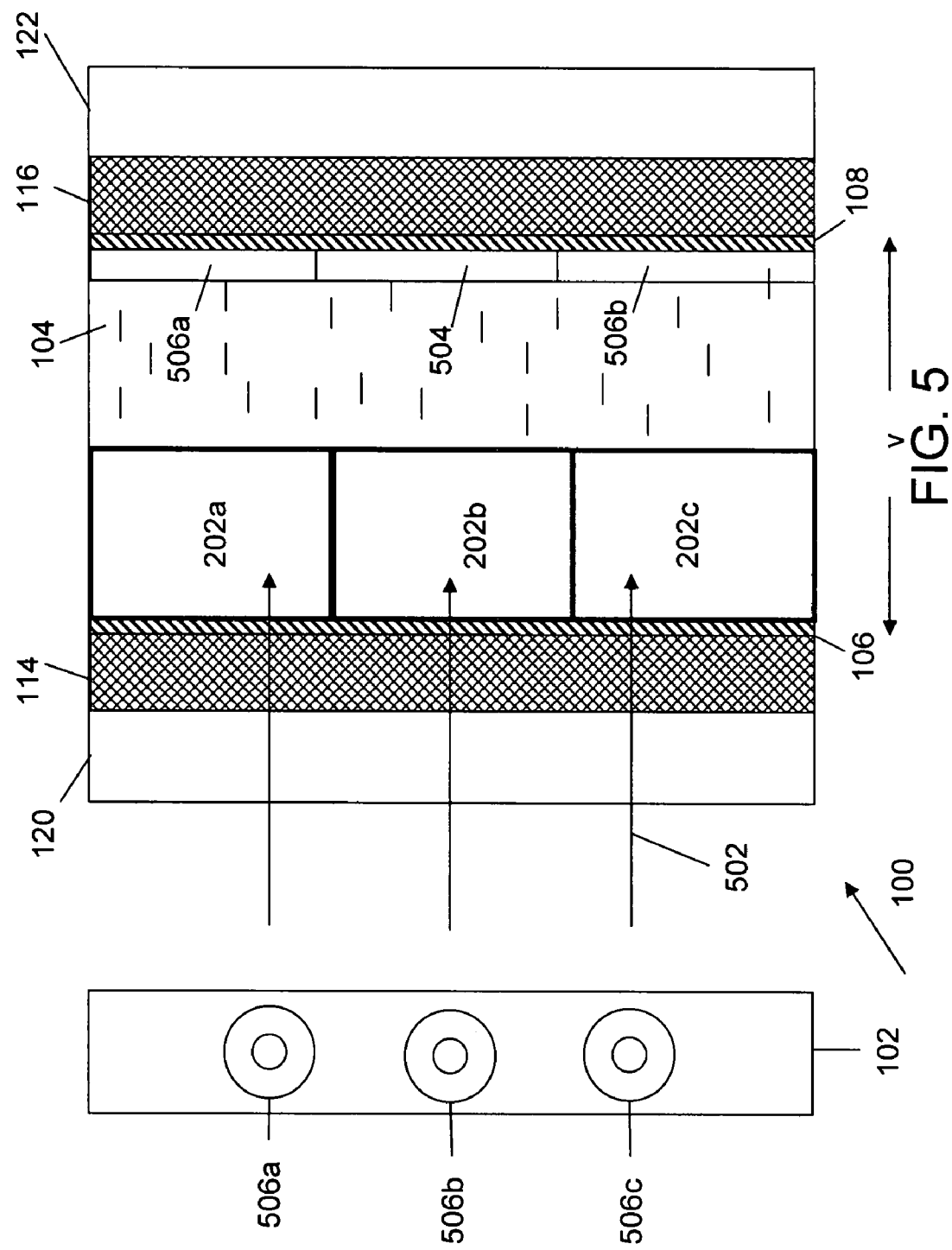

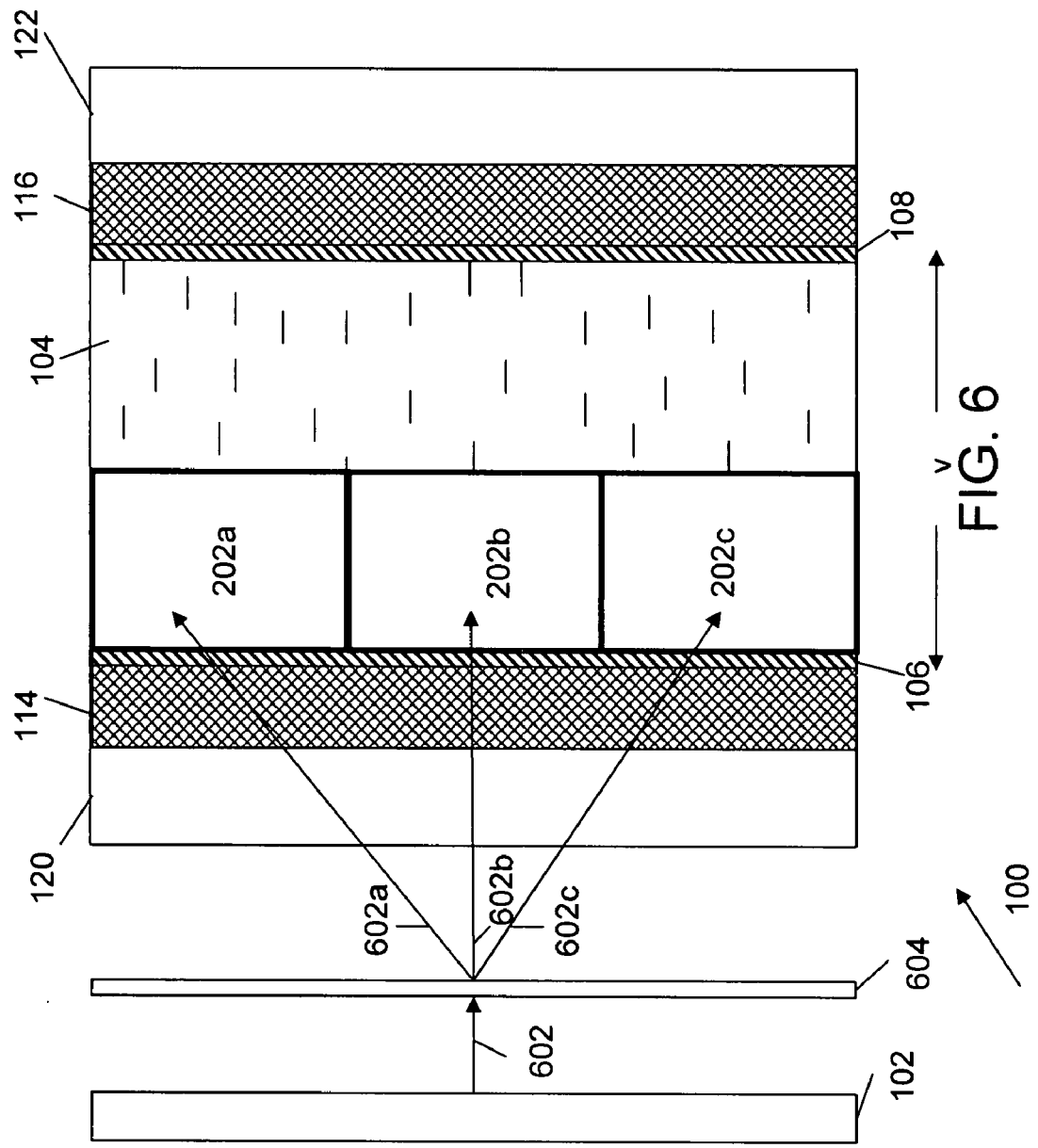

DUAL MODE DISPLAY

REFERENCE TO RELATED APPLICATIONS

This application claims priority of PCT Application PCT1US20061045050 and U.S. provisional application Ser. No. 60/860,247 both filed Nov. 21, 2006 the disclosures of which are hereby incorporated herein by reference.

BACKGROUND

The present invention relates, in general, to a display. More specifically, the present invention relates to a dual mode Liquid Crystal Display (LCD).

The increase in the use of displays in various electronic components has increased the pressure on display manufacturers to provide components that provide better performance. The performance parameters include power consumption, resolution, the frame refresh rate, cost, and sunlight readability. Display manufacturers employ various techniques to improve performance based on these parameters.

One such technique is used in transflective LCDs. Each pixel of the transflective LCD has a reflective part and a transmissive part. The transmissive part and the reflective part also comprise sub-pixels. Each of the sub-pixels has color filters that impart color to the pixel. Additionally, each of the sub-pixels is arranged horizontally or vertically. This requires three or more sub-pixels to represent a color in the LCD.

In the above-mentioned approach, color filters are placed over both the transmissive part and the reflective part. Therefore, the light passing through the color filters is attenuated, making the reflective mode dim and difficult to read. Further, the backlight, in the transmissive mode, requires more power to achieve a high-resolution display. Moreover, the use of horizontally or vertically arranged sub-pixels provides a lower resolution. Furthermore, switching all the color components in the LCD requires a high frequency and power consumption.

In view of the foregoing discussion, there exists a need for a technique that produces a high resolution in LCDs that are sunlight readable. Additionally, a need exists to develop an LCD that requires low power and has a low-frame rate. The present invention fulfills these requirements.

SUMMARY

An objective of the present invention is to provide an LCD that provides better resolution as compared to existing LCDs.

Another objective of the invention is to reduce the power required to illuminate the LCD.

Another objective of the invention is to reduce the frame rate in the LCD.

Yet another objective of the invention is to create a sunlight readable display in the LCD.

The present invention provides an LCD with color filters only over the transmissive part of a pixel, enabling readability in the ambient light. Yet another aspect of the present invention is the elimination of the black matrix mask used typically in color filter creation. Additionally, the present invention provides diagonal pixels to improve the resolution of the LCD in the color transmissive mode. Further, an aspect of the present invention enables the light to switch between two colors, while a third color (typically green) is always on, thereby, decreasing the required frame rate of the LCD, when used in the hybrid field sequential approach. Yet another aspect of the present invention is to create colors from the backlight, thereby, eliminating the need for color filters. Yet another aspect of the present invention is use of color filters over only the green pixels, thereby eliminating the need for using additional masks for making the color filter array.

BRIEF DESCRIPTION OF THE DRAWINGS

Various embodiments of the present invention will herein after be described in conjunction with the appended drawings, provided to illustrate and not to limit the present invention, wherein like designations denote like elements, and in which.

FIG. 3 illustrates the functioning of the LCD in a monochrome reflective mode, in accordance with an embodiment of the present invention;

FIG. 4 illustrates the functioning of the LCD in a color transmissive mode by using a partial color filtered approach, in accordance with an embodiment of the present invention;

FIG. 5 illustrates the functioning of the LCD in a color transmissive mode by using a hybrid field sequential approach, in accordance with an embodiment of the present invention; and FIG. 6 illustrates the functioning of the LCD in a color transmissive mode by using a diffractive approach, in accordance with an embodiment of the present invention.

DESCRIPTION OF VARIOUS EMBODIMENTS

Various embodiments of the present invention relate to a Liquid Crystal Display (LCD) that is capable of functioning in a dual mode, a monochrome reflective mode and a color transmissive mode. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
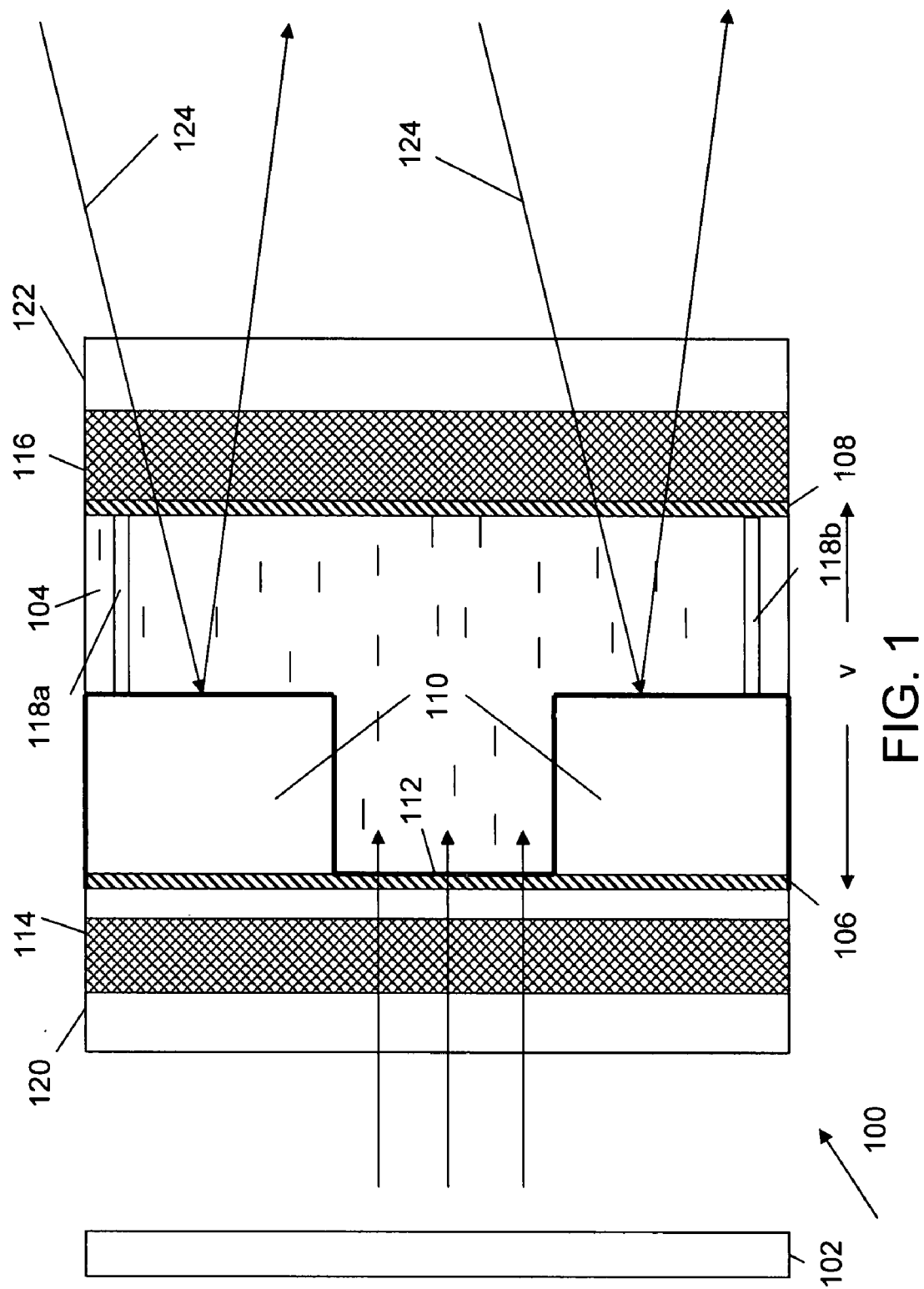
FIG. 1 is a schematic of a cross section of a pixel of a LCD, in accordance with an embodiment of the present invention.

FIG. 1 is a schematic of a cross section of a pixel 100 of a LCD, in accordance with an embodiment of the present invention. Pixel 100 comprises a liquid crystal material 104, a pixel electrode 106, a common electrode 108, a reflective part 110, a transmissive part 112, substrates 114 and 116, spacers 118a and 118b, a first polarizer 120, and a second polarizer 122. In an embodiment of the present invention, a light source 102 or an ambient light 124 illuminates pixel 100. Examples of light source 102 include, but are not limited to, Light Emitting Diodes backlights (LEDs), Cold-Cathode Fluorescent Lamps backlights (CCFLs), and the like. Ambient light 124 can be sunlight or any external source of light. In an embodiment of the present invention, liquid crystal material 104, which is an optically active material, rotates the axis of the polarization of the light from light source 102 or ambient light 124. Liquid crystal 104 can be a Twisted Nematic (TN), an Electrically Controlled Birefringence (ECB) and the like. In an embodiment of the present invention, the rotation of the plane of the light is determined by the potential difference applied between pixel electrode 106, and common electrode 108. In an embodiment of the present invention, pixel electrode 106 and common electrode 108 can be made of Indium Tin Oxide (ITO). Further, each pixel is provided with a pixel electrode, while common electrode 108 is common to all the pixels present in the LCD.

In an embodiment of the present invention, reflective part 110 is electrically conductive and reflects ambient light 124 to illuminate pixel 100. Reflective part 110 is made of metal and is electrically coupled to pixel electrode 106, thereby providing the potential difference between reflective part 110 and common electrode 108. Transmissive part 112 transmits light from light source 102 to illuminate pixel 100. Substrates 114 and 116 enclose liquid crystal material 104, pixel electrode 106 and common electrode 108. In an embodiment of the present invention, pixel electrode 106 is located at substrate 114, and common electrode 108 is located at substrate 116. Additionally, substrate 114 comprises switching elements (not shown in FIG. 1). In an embodiment of the present invention, switching elements can be Thin Film Transistors (TFTs). Further, a driver circuit sends signals related to pixel values to switching elements. In an embodiment of the present invention, the driver circuit uses low voltage differential signaling (LVDS) drivers. In another embodiment of the present invention, transistor-transistor logic (TTL) interface that senses both increase and decrease in voltages is used in the driver circuit. Additionally, a timing controller encodes the signals related to pixel values into the signals needed by the diagonal transmissive parts of the pixels. Furthermore, the timing controller has a memory to allow self-refresh of the LCD when the signals related to the pixels are removed from timing controller.

In an embodiment of the present invention, spacers 118a and 118b are placed over reflective part 110 to maintain a uniform distance between substrates 114 and 116. Additionally, pixel 100 comprises first polarizer 120 and second polarizer 122. In an embodiment of the present invention, the axes of polarity of first polarizer 120 and second polarizer 122 are perpendicular to each other. In another embodiment of the present invention, the axes of polarity of first polarizer 120 and second polarizer 122 are parallel to each other.

Pixel 100 is illuminated by light source 102 or ambient light 124. The intensity of light passing through pixel 100 is determined by the potential difference between pixel electrode 106, and common electrode 108. In an embodiment of the present invention, liquid crystal material 104 is in a disoriented state and the light passing through first polarizer 120 is blocked by second polarizer 122 when no potential difference is applied between pixel electrode 106, and common electrode 108. Liquid crystal material 104 is oriented when the potential difference is applied between pixel electrode 106, and common electrode 108. The orientation of liquid crystal material 104 allows the light to pass through second polarizer 122.

Figure 2:
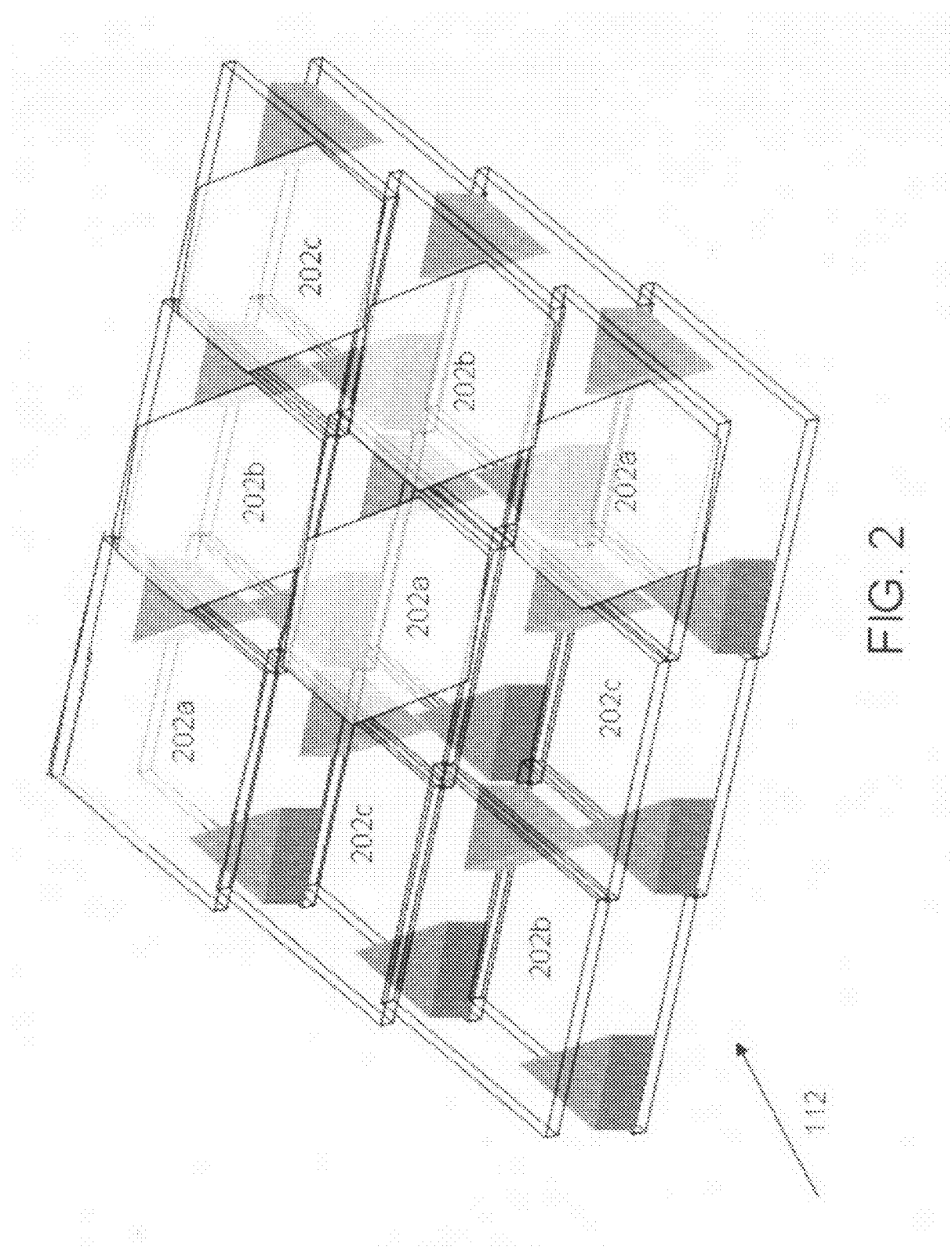
FIG. 2 illustrates the arrangement of nine pixels of the LCD, in accordance with an embodiment of the present invention.

FIG. 2 illustrates the arrangement of nine pixels 112 of the LCD, in accordance with an embodiment of the present invention. Pixel 112 comprises transmissive parts 202a, 202b, 202c and reflective parts. In an embodiment of the present invention, transmissive parts 202a-c impart green, blue and red color components respectively to form a color pixel, if the (Red-Blue-Green) RBG color system is followed. Additionally, transmissive parts 202a-c can impart different colors such as red, green, blue and white or other color combinations, if other color systems are chosen. Additionally, color filters of different thicknesses can be placed over transmissive parts 202a-c to decrease or increase the saturation of the color imparted to the color pixel. Saturation is defined as intensity of a specific gradation of color within the visible spectrum. Further, a colorless filter can be placed over the reflective parts. In various embodiments of the present invention, the thickness of the colorless filter can vary from zero to the thickness of other color filters placed over transmissive parts. In an embodiment of the present invention, transmissive parts 202a represent a diagonal stripe of one of the three colors of the color pixel. Similarly, transmissive parts 202b and 202c represent a diagonal stripe of other two colors of the color pixel. The diagonal stripes are used so that the resolution in the color transmissive mode can be close to the resolution in the monochrome (black and white) reflective mode. The resolution in color transmissive mode is high because the human visual system can detect horizontal and vertical lines while visualizing images. In another embodiment of the present invention, vertical stripes of color can be used that change the resolution more in the horizontal direction and less in the vertical direction when compared to the use of diagonal stripes. The amount of light from light source 102 transmitting through each transmissive parts 202a-c is determined by the switching elements (not shown in FIG. 2). The amount of light transmitting through each transmissive parts 202a-c, in turn, determines the color of the color pixel. Further, the shape of transmissive parts 202a-c and the color filters can be hexagonal, rectangular, octagonal, circular or so forth. Additionally, the shape of reflective parts can be rectangular, circular, octagonal, and the like. Further, reflective parts block light delivered to diagonal stripes from transmitting to pixels of different colors, for example one reflective part blocks light along first transmissive parts from entering to second transmissive parts. Alternatively, a black matrix mask, a covering between pixels and light sensitive areas of pixels, can be used. In an embodiment of the present invention, the black matrix mask is eliminated to improve the reflectivity of the pixels.

FIG. 3 illustrates the functioning of pixel 100 in the monochrome reflective mode, in accordance with an embodiment of the invention. Since the monochrome reflective embodiment is explained with reference to FIG. 3, only reflective part 110 is shown in the figure. Pixel 100 can be used in the monochrome reflective mode in the presence of an external source of light. In an embodiment of the invention, ambient light 124 passes through colorless filter 303, and liquid crystal material 104 and is incident on reflective part 110. Colorless filter 303 is used to maintain the attenuation and the path difference of ambient light 124 same as the attenuation and the path difference of the light in the color transmissive mode. Reflective part 110 of pixel 100 reflects ambient light 124 to substrate 116. In an embodiment of the present invention, a potential difference (v) is applied to pixel electrode 106, which is electronically coupled to the reflective part 110 and common electrode 108. Liquid crystal material 104 is oriented, depending on the potential difference (v). Consequently, the orientation of liquid crystal material 104 rotates the plane of ambient light 124, allowing the light to pass through second polarizer 122. The degree of orientation of liquid crystal material 104 therefore determines the brightness of pixel 100 and consequently, the luminance of pixel 100.

In an embodiment of the present invention, a normally white liquid crystal embodiment can be employed in pixel 100. In this embodiment of the present invention, axes of first polarizer 120 and second polarizer 122 are parallel to each other. The maximum threshold voltage is applied across pixel electrode 106, and common electrode 108 to block the light reflected by reflective part 110. Pixel 100 therefore appears black. Alternatively, a normally black liquid crystal embodiment can be used. In this embodiment of the present invention, axes of first polarizer 120 and second polarizer 122 are perpendicular to each other. The maximum threshold voltage is applied across pixel electrode 106, and common electrode 108 to illuminate pixel 100.

FIG. 4 illustrates the functioning of the LCD in the color transmissive mode by using a partial color filtered approach, in accordance with an embodiment of the present invention. Since the color transmissive embodiment is been explained, only transmissive parts 202a-c are shown in FIG. 4. On substrate 116, color filters 404a, 404b and 404c are respectively placed for transmissive parts 202a, 202b and 202c, as shown in FIG. 4. Light source 102 is a standard backlight source. Light 402 from light source 102 can be collimated by using a collimating light guide or lens. In an embodiment of the present invention, light 402, coming from light source 102, is passed through first polarizer 120. This aligns the plane of light 402 in a particular plane. In an embodiment of the present invention, the plane of light 402 is aligned in the horizontal direction. Additionally, second polarizer 122 has an axis of polarization in the vertical direction. Transmissive parts 202a-c transmit light 402. In an embodiment of the present invention, each of transmissive parts 202a-c has an individual switching element. The switching element controls the intensity of light 402 passing through the corresponding transmissive part. Further, light 402, after transmitting through transmissive parts 202a-c, passes through liquid crystal material 104. Transmissive parts 202a, 202b, 202c are provided with pixel electrodes respectively. The potential differences applied between the pixel electrodes, and common electrode 108 determine the orientation of liquid crystal material 104. The orientation of liquid crystal material 104, in turn, determines the intensity of light 402 incident on each color filter 404a-c.

In an embodiment of the present invention, a green color filter 404a is placed over transmissive part 202a, a blue color filter 404b is placed over transmissive part 202b and a red color filter 404c is placed over transmissive part 202c. Each of color filters 404a-c imparts the corresponding color to the color pixel. The colors imparted by color filters 404a-c determine the chrominance value of the color pixel.

Chrominance contains the color information such as hue and saturation for a pixel. Further, if there is ambient light 124, the light reflected by reflective part 110 (shown in FIGS. 2 and 3) provides luminance to the color pixel. This luminance therefore increases the resolution in the color transmissive mode. Luminance is a measure of the brightness of a pixel.

FIG. 5 illustrates the functioning of the LCD in the color transmissive mode by using a hybrid field sequential approach, in accordance with various embodiments of the present invention. Since the color transmissive embodiment is being explained, only transmissive parts 202a-c are shown in FIG. 5. In an embodiment of the present invention, light source 102 comprises strips of LEDs such as LED group 1, LED group 2 and so on (not shown). In an embodiment of the present invention, the LEDs that are arranged horizontally are grouped together, one LED group below the other, to illuminate the LCD. Alternatively, the LEDs that are arranged vertically can be grouped. The LEDs groups are illuminated in a sequential manner. The frequency of illumination of an LED group can be between 30 frames to 540 frames per second. In an embodiment of the present invention, each LED group comprises red LEDs 506a, white LEDs 506b and blue LEDs 506c. Further, red LEDs 506a and white LEDs 506b of LED group 1 are on from time t 0 to t=5 and red LEDs 506a and white LEDs 506b of LED group 2 are on from time t=1 to t=6. Similarly, all the red and white LEDs of other LED groups function in a sequential manner. In an embodiment of the present invention, each LED group illuminates a horizontal row of pixels of the LCD, in case the LED groups are arranged vertically. Similarly blue LEDs 506c and white LEDs 506b of LED group 1 are on from time t=5 to t=10, and blue LEDs 506c and white LEDs 506b of LED group 2 are on from time t=6 to t=11. Similarly, all the blue and white LEDs of other LED groups are on in a sequential manner. Red LEDs 506a, white LEDs 506b and blue LEDs 506b are arranged so that Red LEDs 506a and blue LEDs 506b illuminate transmissive parts 202a and 202c and white LEDs 506b illuminate transmissive part 202b. In another embodiment of the present invention, the LED groups may comprise red, green and blue LEDs. Red, green and blue LEDs are so arranged that green LEDs illuminate transmissive part 202b and red and blue LEDs illuminate transmissive parts 202a and 202c, respectively.

In an embodiment of the present invention, light 502 from light source 102 is passed through first polarizer 120. First polarizer 120 aligns the plane of light 502 in a particular plane. In an embodiment of the present invention, the plane of light 502 is aligned in a horizontal direction. Additionally, second polarizer 122 has the axis of polarization in the vertical direction. Transmissive parts 202a-c transmit light 502. In an embodiment of the present invention, each of transmissive parts 202a-c has an individual switching element. Further, switching elements control the intensity of light passing through each of transmissive parts 202a-c, thereby controlling the intensity of the color component. Further, light 502, after passing through transmissive parts 202a-c, passes through liquid crystal material 104. Each of transmissive parts 202a-c has its own pixel electrode 106a-c respectively. The potential differences applied between pixel electrodes 106a-c, and common electrode 108 determines the orientation of liquid crystal material 104. In the embodiment in which red, white, and blue LEDs are used, the orientation of liquid crystal material 104, in turn, determines the intensity of light 502 incident on a green color filter 504, and transparent spacers 508a and 508b. The intensity of light 502 passing though green filter 504, and transparent spacers 508a and 508b determines the chrominance value of the color pixel. In an embodiment of the present invention, green color filter 504, is placed corresponding to transmissive part 112b. Transmissive part 202a and 202c do not have a color filter. Alternatively, transmissive parts 202a and 202c can use transparent spacers 508a and 508b respectively. Green color filter 504, transparent spacers 508a and 508b are located on substrate 116. In another embodiment of the present invention, magenta color filters can be placed over transparent spacers 508a and 508b. In an embodiment of the present invention, during time t=0 to t=5, when red LED 506a and white LED 506b are on, transmissive parts 202a and 202c are red and green filter 504 imparts a green color to transmissive part 202b. Similarly, during time t=6 to t=11, when blue LED 506c and white LEDs 506b are on, transmissive parts 202a and 202c are blue, and green filter 504 imparts a green color to transmissive part 202b. The color imparted to the color pixel is formed by the combination of colors from transmissive parts 202a-c. Further, if ambient light 124 is available, the light reflected by reflective part 110 (shown in FIGS. 2 and 3) provides luminance to the color pixel. This luminance therefore increases the resolution in the color transmissive mode.

FIG. 6 illustrates the functioning of the LCD in the color transmissive mode by using a diffractive approach, in accordance with an embodiment of the present invention. Since the color transmissive embodiment is being explained, only transmissive parts 202a-c are shown in FIG. 6. Light source 102 can be a standard backlight source. In an embodiment of the present invention, light 602 from light source 102 is split into a green component 602a, a blue component 602b and a red component 602c by using a diffraction grating 604. Alternatively, light 602 can be split into a spectrum of colors with a different part of the spectrum going through each of transmissive parts 202a-c using a micro-optical structure. In an embodiment of the present invention, the micro-optical structure is a flat film optical structure with small lensets that can be stamped or imparted into the film. Green component 602a, blue component 602b and red component 602c are directed to transmissive parts 112a, 112b and 112c, respectively, using diffraction grating 604. Further, the components of light 602 are passed through first polarizer 120. This aligns the plane of light components 602a-c in a particular plane. In an embodiment of the present invention, the plane of light components 602a-c is aligned in the horizontal direction. Additionally, second polarizer 122 has its axis of polarization in the vertical direction. Transmissive parts 202a-c allow light components 602a-c to be transmitted through them. In an embodiment of the present invention, each of transmissive parts 202a-c has an individual switching element. Switching elements control the intensity of light passing through each of transmissive parts 202a-c, thereby controlling the intensity of the color component. Further, light components 602a-c, after passing through transmissive parts 202a-c, passes through liquid crystal material 104. Transmissive parts 202a, 202b and 202c respectively have pixel electrodes. The potential differences applied between pixel electrodes 106, and common electrode 108 determines the orientation of liquid crystal material 104. The orientation of liquid crystal material 104, in turn, determines the intensity of light components 602a-c passing through second polarizer 122. The intensity of color components passing through second polarizer 122 in turn decides the chrominance of the color pixel. Further, if ambient light is available, the light reflected by reflective part 110 (shown in FIGS. 2 and 3) provides luminance to the color pixel. This luminance therefore increases the resolution in the color transmissive mode.

As presented herein, transmissive part of the pixel is arranged diagonally rather than vertically or horizontally, as in the case of prior known LCDs. The diagonal arrangement of the transmissive part increases the resolution, as compared to prior known LCDs and therefore provides a better display.

Additionally, the presence of ambient light enhances the luminance of the color pixel in the color transmissive mode. Therefore, each pixel has both luminance and chrominance. This increases the resolution of the LCD. Consequently, the number of pixels required for a particular resolution is lower than in prior known LCDs, thereby decreasing the power consumption of the LCD. Further, a Transistor—Transistor Logic (TTL) based interface can be used that lowers the power consumption of the LCD as compared to the power consumed by the interfaces used in prior known LCDs. Additionally, because the timing controller stores the signals related to pixel values, the LCD is optimized for using the self refresh property, thereby decreasing the power consumption. In various embodiments of the invention, thinner color filters which transmit less saturated color and more light can be used. Hence, various embodiments of the invention facilitate the process of reducing the power consumption, as compared to prior known LCD Further, in an embodiment of the invention (described in FIG. 5), green or white color light is always visible on pixel 100, and only the red and blue color lights are switched. Therefore, a lower frame rate is required as compared to the frame rate of prior known field sequential displays.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A dual mode Liquid Crystal display, comprising:
   a. a light source for illuminating the dual mode display;
   b. a first polarizer for aligning the plane of polarization of light from the light source to a first plane
   c. a second polarizer for aligning the plane of polarization of the light from the light source to a pre-defined second plane;
   d. a first substrate and a second substrate, the first substrate and the second substrate being interposed between the first polarizer and the second polarizer; and
   e. a plurality of pixels, each of the plurality of pixels being positioned at the first substrate, each of the plurality of pixels comprising a reflective part and a transmissive part, wherein the reflective part has no color filter, at least part of the transmissive part comprises one or more color-filters;
   wherein each of the one or more color filters imparts one of three different colors, and transmissive parts of pixels imparted with a first color of the three different colors are arranged in a first diagonal stripe, transmissive parts of pixels imparted with a second color of the three different colors are arranged in a second diagonal stripe, and transmissive parts of pixels imparted with a third color of the three different colors are arranged in a third diagonal stripe.

2. The dual mode Liquid Crystal Display according to claim 1, wherein the reflective part occupies opposite corners of the plurality of pixels.

3. The dual mode Liquid Crystal Display according to claim 1, wherein the transmissive part occupies center of the plurality of pixels.

4. The dual mode Liquid Crystal Display according to claim 1, wherein a spectrum of color is generated from the light from the light source using a diffractive or a micro-optical film.

5. The dual mode Liquid Crystal Display according to claim 1, wherein the one or more color-filters are of different thickness.

6. The dual mode Liquid Crystal Display according to claim 1, wherein the one or more color-filters are of same thickness.

7. The dual mode Liquid Crystal Display according to claim 1 further comprises one or more colorless filters over the reflective part.

8. The dual mode Liquid Crystal Display according to claim 7 wherein the one or more colorless filters are of same thickness.

9. The dual mode Liquid Crystal Display according to claim 7 wherein the one or more colorless filters are of different thickness.

10. The dual mode Liquid Crystal Display according to claim 1 further comprises a driver circuit to provide pixel values to a plurality of switching elements, the plurality of switching elements determines the light transmitting through the transmissive part.

11. The dual mode Liquid Crystal Display according to claim 10 further comprises a Transistor-Transistor-Logic interface.

12. The dual mode Liquid Crystal Display according to claim 10 further comprises a timing control circuit to refresh the pixel values of the dual mode Liquid Crystal Display.

13. The dual mode Liquid Crystal Display according to claim 1, wherein the dual mode Liquid Crystal Display is used in a notebook computer.

14. The dual mode Liquid Crystal Display according to claim 1, wherein the transmissive parts have a shape that is any of hexagonal, rectangular and octagonal and circular.

15. The dual mode Liquid Crystal Display according to claim 1, wherein the color filters have a shape that is any of hexagonal, rectangular and octagonal and circular.

16. The dual mode Liquid Crystal Display according to claim 1, wherein the reflective parts have a shape that is any of hexagonal, rectangular, octagonal and circular.

17. The dual mode Liquid Crystal Display according to claim 1, wherein the reflective parts are arranged to block light that is delivered to the diagonal stripes from transmitting to pixels of different colors.

18. The dual mode Liquid Crystal Display according to claim 1, wherein the light source comprises green, white, red, and blue light emitting diodes (LEDs) and a driving circuit that is configured to cause, in operation, green light or white light always to be visible and to switch only the red LEDs and the blue LEDs.

19. A dual mode Liquid Crystal display, comprising:
   a light source for illuminating the dual mode display;
   a first substrate;
   a plurality of pixels, each of the plurality of pixels at the first substrate, each of the plurality of pixels comprising a reflective part and a transmissive part, wherein the reflective part has no color filter, at least part of the transmissive part comprises one or more color-filters;
   wherein each of the one or more color filters imparts one of three different colors, and transmissive parts of pixels imparted with a first color of the three different colors are arranged in a first diagonal stripe, the transmissive parts of pixels imparted with a second color of the three different colors are arranged in a second diagonal stripe, and transmissive parts of pixels imparted with a third color of the three different colors are arranged in a third diagonal stripe.

20. The dual mode Liquid Crystal Display according to claim 19, wherein the transmissive parts have a shape that is any of hexagonal, rectangular and octagonal and circular.

* * * * *